US005893423A

United States Patent [19]
Selfors et al.

[11] Patent Number: 5,893,423
[45] Date of Patent: Apr. 13, 1999

[54] INTEGRATION OF TURBOALTERNATOR FOR HYBRID MOTOR VEHICLE

[75] Inventors: Brian J. Selfors, Boston; Arnold M. Heitmann, Swampscott, both of Mass.

[73] Assignee: SatCon Technology Corporation, Cambridge, Mass.

[21] Appl. No.: 08/642,090

[22] Filed: May 2, 1996

[51] Int. Cl.[6] .................................................. B60K 1/00
[52] U.S. Cl. ................................................ 180/65.2; 290/52
[58] Field of Search ............................ 180/69.6, 65.3, 180/68.1, 60; 290/52; 60/39.511; 415/175, 176; 416/DIG. 4

[56] References Cited

U.S. PATENT DOCUMENTS

| | | | |
|---|---|---|---|
| 4,038,558 | 7/1977 | Gallois | 290/52 |
| 4,038,815 | 8/1977 | Heitmann et al. | 60/39.08 |
| 4,049,972 | 9/1977 | Crowdy et al. | 290/52 |
| 4,253,031 | 2/1981 | Frister | 290/52 |
| 4,526,013 | 7/1985 | Joy | 62/236 |
| 4,809,803 | 3/1989 | Ahern et al. | 180/65.4 |
| 4,929,158 | 5/1990 | Girault | 417/405 |
| 5,083,077 | 1/1992 | Wallace et al. | 322/32 |
| 5,137,373 | 8/1992 | Ide | 384/117 |
| 5,212,431 | 5/1993 | Origuchi et al. | 318/139 |
| 5,393,145 | 2/1995 | Ide | 384/124 |
| 5,497,615 | 3/1996 | Noe et al. | 60/39.511 |
| 5,568,023 | 10/1996 | Grayer et al. | 318/139 |

OTHER PUBLICATIONS

Popular Science –Jun. 1994.
Automotive Engineering –Dec. 1994, pp. 30–33.
Automotive News, Jun. 6, 1994.

*Primary Examiner*—Peter M. Poon
*Assistant Examiner*—Pamela J. Lipka
*Attorney, Agent, or Firm*—George W. Neuner

[57] ABSTRACT

A turboalternator for a hybrid motor vehicle includes at least one compressor, at least one turbine, at least one alternator disposed between the at least one compressor and the at least one turbine, and a common shaft interconnecting the at least one compressor and the at least one alternator and the at least one turbine.

20 Claims, 5 Drawing Sheets

INTEGRATION OF TURBOALTERNATOR FOR HYBRID MOTOR VEHICLE

BACKGROUND OF THE INVENTION

1. Field of the Invention

The present invention relates generally to hybrid motor vehicles and, more particularly, to a turboalternator for a hybrid motor vehicle.

2. Description of the Related Art

Since the advent of powered motor vehicles, many different powertrain systems have been used, including a steam engine with a boiler, an electric motor with a storage battery, or an internal combustion engine with fossil fuel.

Although fossil fuel emerged as the fuel of choice for motor vehicles, recent concerns regarding fuel availability and increasingly stringent Federal and State emission regulations have renewed interest in alternative powered motor vehicles. For example, motor vehicles may be powered by methanol, ethanol, natural gas, electricity or a combination of fuels.

A dedicated electric powered motor vehicle offers several advantages: electricity is readily available; an electric power distribution system is already in place; and an electric powered motor vehicle produces virtually zero emissions. There are several technological disadvantages that must be overcome before electric powered motor vehicles gain acceptance in the marketplace. For instance, the range of an electric powered motor vehicle is limited to approximately 100 miles, compared to about 300 miles for a fossil fuel powered motor vehicle. Further, the acceleration is about half that of a similar fossil fuel powered motor vehicle. Significant advances in battery technology are required to overcome these technological disadvantages.

A hybrid motor vehicle, powered by electric and a fossil fuel, overcomes the technical disadvantages of a dedicated electric powered motor vehicle while having almost the same environmental benefit as a dedicated electric powered motor vehicle. The performance and range characteristics are comparable to a conventional fossil fuel powered motor vehicle. Thus, there is a need in the art for a hybrid motor vehicle that is energy efficient, has low emissions, and offers the performance of a conventional fossil fuel powered motor vehicle.

SUMMARY OF THE INVENTION

It is, therefore, one object of the present invention to provide a new and improved hybrid motor vehicle.

It is another object of the present invention to provide a turboalternator for a hybrid motor vehicle.

It is yet another object of the present invention to provide an integrated alternator, compressor and turbine for a turboalternator of a hybrid motor vehicle.

It is still another object of the present invention to provide integral bearing lubrication and rotor cooling for a turboalternator of a hybrid motor vehicle.

It is a further object of the present invention to provide a tapered hydraulic fit for compressor and turbine impellers for a turboalternator of a hybrid motor vehicle.

It is still a further object of the present invention to provide a hollow titanium compressor for a turboalternator of a hybrid motor vehicle.

To achieve the foregoing objects, the present invention is a turboalternator for a hybrid motor vehicle. The turboalternator includes at least one compressor, at least one turbine and at least one alternator disposed between the at least one compressor and at least one turbine. The turboalternator also includes a common shaft interconnecting the at least one compressor and the at least one alternator and the at least one turbine.

One advantage of the present invention is that a new and improved hybrid motor vehicle is provided that is energy efficient, low emissions and offers the performance of a conventional fossil fuel powered motor vehicle. Another advantage of the present invention is that a turboalternator is provided for a hybrid motor vehicle. Yet another advantage of the present invention is that the turboalternator has two alternators arranged independently and eliminates the need for gears to connect the turbines to the alternators. Still another advantage of the present invention is that the turboalternator has integrated the alternator with the compressor and the turbine, eliminating the need for gear reduction. A further advantage of the present invention is that the turboalternator has integral bearing lubrication and rotor cooling for the rotor of the alternator. Yet a further advantage of the present invention is that the turboalternator has a tapered hydraulic fit for the compressor and turbine impellers, allowing the ability to use dissimilar component materials and a consistent component to assembly dynamic balance. Still a further advantage of the present invention is that the turboalternator has a hollow titanium compressor impeller for improved dynamics through reduced mass and increased rotor stiffness.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
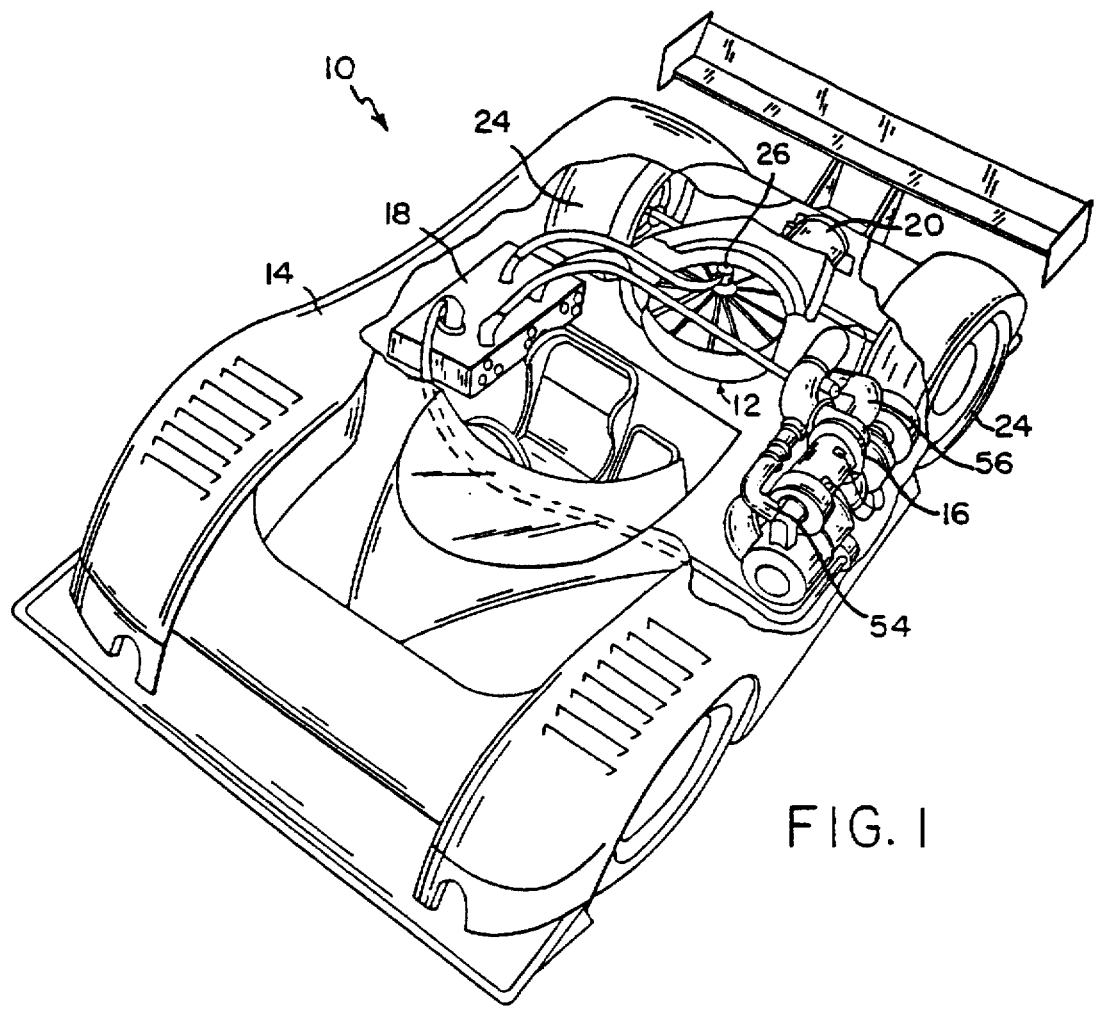
FIG. 1 is a perspective view of a hybrid motor vehicle according to the present invention.
Figure 2:
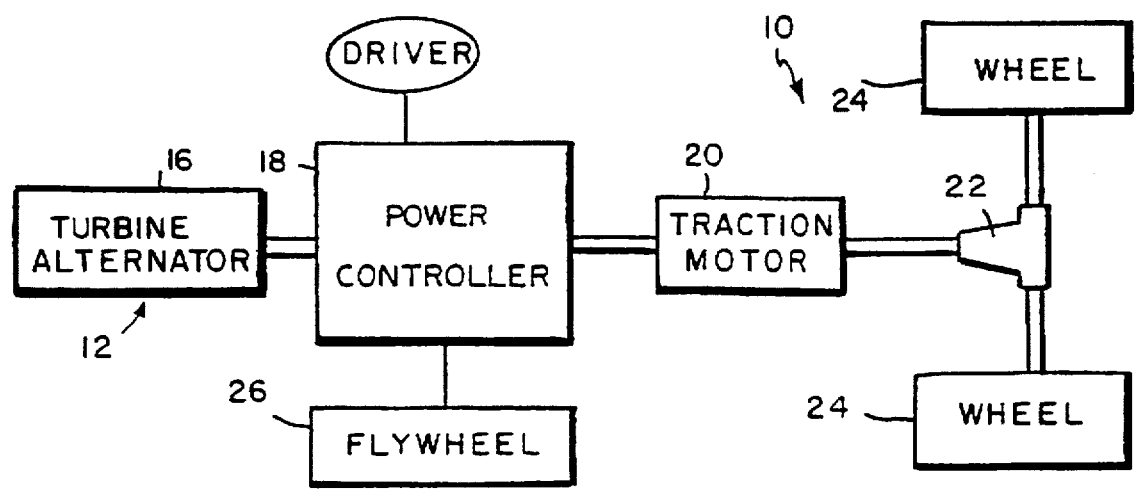
FIG. 2 is a block diagram of the hybrid motor vehicle of FIG. 1.

Referring to FIGS. 1 and 2, a hybrid motor vehicle 10, according to the present invention, is shown. The vehicle 10 includes a hybrid powertrain system 12 disposed within a chassis 14. The hybrid powertrain system 12 includes a turbine-driven alternator or turboalternator 16, which in this example, is fueled by a fossil fuel such as a liquefied natural gas. The turboalternator 16 generates electric power to operate the vehicle 10. It should be appreciated that, in this example, the turboalternator 16 has a low speed portion and a high speed portion to be described that run at different speeds, such as 60,000 rpm and 100,000 rpm, respectively, to produce electrical power equivalent to five hundred (500) horsepower. It should also be appreciated that the respective speeds of the high speed portion and low speed portion are independent of each other, but supply electrical power to the power controller 18.

The hybrid powertrain system 12 also includes a vehicle management or power controller 18 electrically connected to and in communication with the turboalternator 16. The power controller 18 manages the distribution of electrical power within the hybrid powertrain system 12. The hybrid powertrain system 12 includes a traction motor 20 electrically connected to and in communication with the power controller 18. The power controller 18 directs the transfer of electrical power from the turboalternator 16 to the traction motor 20 using a three phase Variable Frequency AC Current (VFAC). In this example, the traction motor 20 is an AC induction traction motor capable of producing seven hundred fifty (750) horsepower. The traction motor 20 then transfers the power to a drivetrain 22 and wheels 24 of the vehicle 10 to provide movement of the vehicle 10.

The hybrid powertrain system 12 further includes an energy storage apparatus such as a flywheel 26. The flywheel 26 is electrically connected to and in communication with the power controller 18. The power controller 18 directs the electrical power from the turboalternator 16 through VFAC lines to the flywheel 26 for storage during periods of low power demand. The power controller 18 also directs the stored electrical power from the flywheel 26 to the traction motor 20 during periods of high power demand.

In operation, a signal from an operator such as a driver to accelerate the hybrid motor vehicle 10 is communicated to the power controller 18. The power controller 18 directs the turboalternator 16 and, if necessary, the flywheel 26, to supply electrical power to the traction motor 20. If the power needs of the traction motor 20 is low, the power controller 18 directs the excess power capacity from the turboalternator 16 into the flywheel 26 for storage.

The hybrid motor vehicle 10 also includes various critically placed sensors which are conventional and well known in the art. The outputs of these sensors communicate with the power controller 18. It should be appreciated that the hybrid motor vehicle 10 includes other hardware now shown, but conventional in the art to cooperate with the hybrid powertrain system 12.

Figure 3:
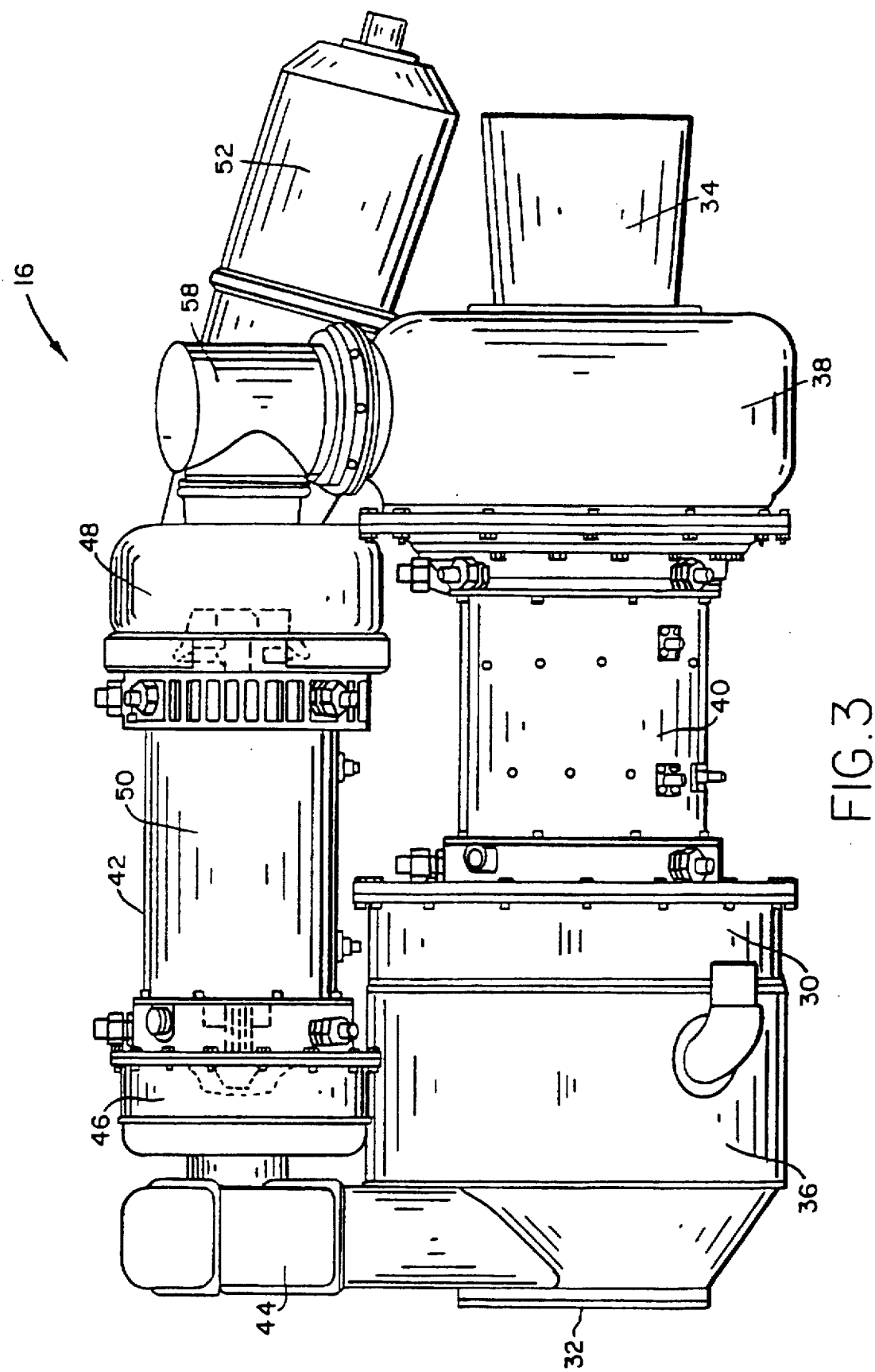
FIG. 3 is an elevational view of a turboalternator, according to the present invention, of the hybrid motor vehicle of FIGS. 1 and 2.
Figure 4:
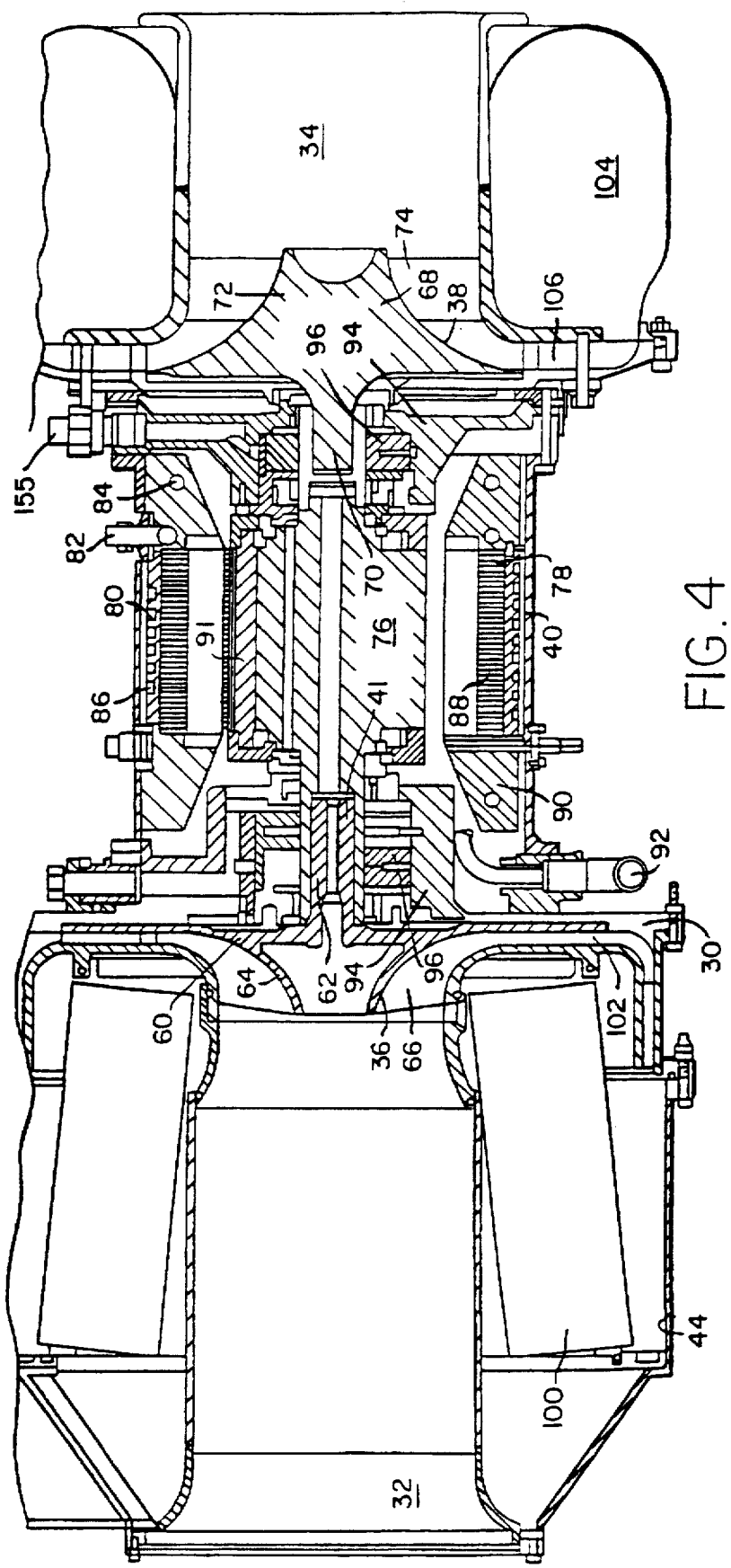
FIG. 4 is a fragmentary elevational view of a low speed portion of the turboalternator of FIG. 3.
Figure 5:
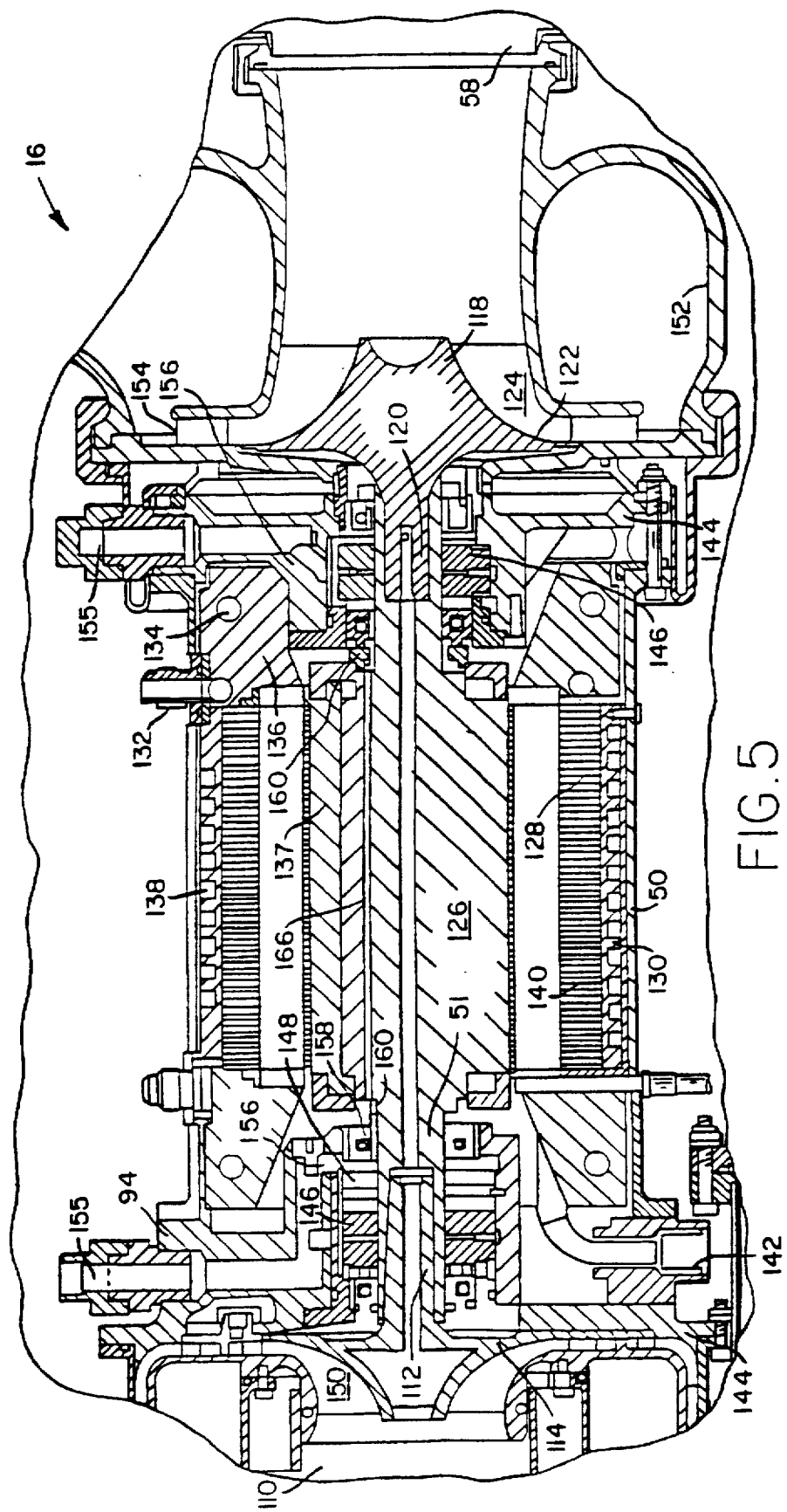
FIG. 5 is a fragmentary elevational view of a high speed portion of the turboalternator of FIG. 3.

Referring to FIGS. 3 through 5, the turboalternator 16 includes a first housing 30 extending axially and having an intake 32 at one end and an exhaust 34 at the other end. The turboalternator 16 includes a low speed compressor 36 disposed within the housing 30 adjacent the intake 32 and a low speed turbine 38 disposed within the housing 30 adjacent the exhaust 34. The turboalternator 16 includes a low speed alternator, generally indicated at 40, disposed within the housing 30 between the compressor 36 and the turbine 38. The turboalternator 16 further includes a common shaft 41 interconnecting the compressor 36, alternator 40 and turbine 38. It should be appreciated that the compressor 36, alternator 40, and turbine 38 form a low speed portion of the turboalternator 16.

The turboalternator 16 includes a second housing 42 extending axially and an intercooler duct 44 interconnecting the first housing 30 and second housing 42. The turboalternator 16 includes a high speed compressor 46 disposed within the second housing 42 adjacent the intercooler duct 44 and a high speed turbine 48 disposed within the second housing 42 adjacent the other end of the second housing 42. The turboalternator 16 includes a high speed alternator, generally indicated at 50, disposed within the second housing 42 between the compressor 46 and turbine 48. The turboalternator 16 further includes a common shaft 51 interconnecting the compressor 46, alternator 50 and turbine 48. It should be appreciated that the compressor 46, alternator 50 and turbine 48 form a high speed portion of the turboalternator 16. It should also be appreciated that the high speed portion and low speed portion are two parallel spool configurations of the turboalternator 16.

The turboalternator 16 includes a combustor 52 connected by an intake duct 54 (FIG. 1) to the high speed compressor 46 and by an exhaust duct 56 (FIG. 1) to the high speed turbine 48. The turboalternator 16 includes a transition or turbine duct 58 interconnecting the high speed turbine 48 and the low speed turbine 38. Preferably, the exhaust duct 56 and turbine duct 58 are made of Hastelloy -X, a standard nickel alloy.

Referring to FIG. 4, the low speed compressor 36 includes a low speed or pressure compressor impeller 60 for compressing the air from the intake 32. The compressor impeller 60 has a first end 62 extending axially and a second end 64 extending radially. The second end 64 has a plurality of blades 66 disposed circumferentially thereabout. The blades 66 are of the radial type. The compressor impeller 60 is connected to the shaft 41 in a manner to be described. It should be appreciated that the compressor impeller 60 and shaft 41 rotate together.

The low speed turbine 38 includes a low speed or pressure turbine impeller 68 to generate power in a manner to be described. The turbine impeller 68 has a first end 70 extending axially and a second end 72 extending radially. The second end 72 has a plurality of blades 74 disposed circumferentially thereabout. The blades 74 are of the radial inflow type. Preferably, the blades 74 are a high-temperature-tolerant alloy such as MAR-M-247 or a ceramic such as a silicon nitride. The turbine impeller 68 is connected to the shaft 41 in a manner to be described. It should be appreciated that the turbine impeller 68 and shaft 41 rotate together. It should also be appreciated that the forward face of the turbine impeller 68 receives cooling air from the compressor 36.

The low speed alternator 40 includes a low speed or pressure alternator rotor 76 which extends radially from the shaft 41. Preferably, the rotor 76 and shaft 41 are integral and formed as one-piece. The low speed alternator 40 also includes a low speed or pressure stator 78 disposed concentrically about the rotor 76 and attached to the housing 30 by suitable means such as fasteners having an insulating bushing. The stator 78 has a cooling jacket 80 adjacent the housing 30 and a stator coolant connection 82, (only one of which is shown) to allow coolant to enter and exit the stator 78. Preferably, an insulator is disposed between the cooling jacket 80 and the housing 30. It should be appreciated that coolant flows through tubes 84 in windings 90 of the stator 78 and channels 86 in the cooling jacket 80.

The stator 78 has a plurality of laminations 88 through which the windings 90 axially extend. The windings 90 are made of copper wire and potted in epoxy as is known in the art. The stator 78 includes a three phase electrical power connector 92, only one phase of which is shown, connected to the windings 90. The passing of current through the windings 90 creates a magnetic field which extends radially past the inner diameter of the stator 78. The windings 90 have end turns which extend around the inner diameter on the end of the stator 78. It should be appreciated that the end turns are a convenient way to form a closed circuit for each of the windings.

The rotor 76 includes a plurality of nonlinear slots cut through the length adjacent the outer diameter of the rotor. Within each slot, a magnetically susceptible bar 91 is forced therein. The magnetically susceptible bars 91 extend axially adjacent the rotor outer diameter. The magnetically susceptible bars 91 receive the magnetic field created by the electrical currents passing through the windings 90 and create a current therein. Upon receiving the magnetic fields, the magnetically susceptible bars 91 are forced to move relative to their existing position, rendering the rotation of the rotor 76. The magnetically susceptible bars 91 are spaced equidistantly from each other about the rotor outer diameter.

The magnetically susceptible bars 91 are fabricated from a copper alloy. More specifically, these coppers bars are fabricated from copper with forty percent (40%) by weight of the bars coming from an aluminum oxide. The aluminum oxide enables the coppers bars to maintain a higher tensile strength, a lower weight, and a more effective surface area for better high frequency current capability. The tensile strength is approximately 50 ksi, as opposed to 15 ksi, at 600° F.

The alternator rotor 76 and shaft 41 are supported in a titanium bearing frame 94 of the housing 30 by hydrodynamic radial or rotary bearings 96. The alternator rotor 76 and shaft 41 are also supported by hydrodynamic thrust or axial bearings 98 disposed between the shaft 41 and the bearing frame 94. The bearings are used to support and align the alternator rotor 76. Suitable bearings can be commercially purchased from KMC, Inc. of W. Greenwich, R.I. The alternator rotor 76 is a solid rotor of AERMET 100 steel having a central bore. It should be appreciated that the alternator rotor 76 is cooled in a manner to be described since the solid rotor heats up from eddy current losses.

The intercooler duct 44 includes a heat exchanger 100 disposed therein to cool the compressed air which flows from the compressor 36 through a passageway 102 to the heat exchanger 100. Preferably, the intercooler duct 44 is made of a stainless steel material and the heat exchanger 100 is made of an aluminum material.

At the aft end of the turboalternator 16, the turbine 38 includes a turbine shroud or housing 104 disposed about the exhaust 34. The turbine housing 104 communicates with the turbine duct 58 and receives exhaust gases which flow through a passageway 106 to the turbine impeller 68. Preferably, the turbine housing 104 is made of an Inconel 718 alloy material as is known in the art. It should be appreciated that the gases from the high speed turbine enter the duct 58 at a temperature of about 1400° F. or 760° C.

Referring to FIG. 5, the high speed compressor 46 includes a high speed or pressure compressor impeller 108 for compressing the air from an intake shroud 110 disposed within an outlet of the intercooler duct 44. The compressor impeller 108 has a first end 112 extending axially and a second end 114 extending radially. The second end 114 has a plurality of blades 116 disposed circumferentially thereabout. The blades 116 are of the radial type. The compressor impeller 108 is connected to the shaft 51 in a manner to be described. It should be appreciated that the compressor impeller 108 and shaft 51 rotate together.

The high speed turbine 48 includes a high speed or pressure turbine impeller 118 to generate power in a manner to be described. The turbine impeller 118 has a first end 120 extending axially and a second end 122 extending radially. The second end 122 has a plurality of blades 124 disposed circumferentially thereabout. The blades 124 are of the radial inflow type. Preferably, the blades 124 are a high-temperature-tolerant alloy such as MAR-M-247 or a ceramic such as a silicon nitride. The turbine impeller 118 is connected to the shaft 51 in a manner to be described. It should be appreciated that the turbine impeller 118 and shaft 51 rotate together.

The high speed alternator 50 includes a high speed or pressure alternator rotor 126 which extends radially from the shaft 51. Preferably, the rotor 126 and shaft 51 are integral and formed as one-piece. The high speed alternator 50 also includes a high speed or pressure stator 128 disposed concentrically about the rotor 126 and attached to the housing 42 by suitable means such as fasteners having an insulating bushing. The stator 128 has a cooling jacket 130 adjacent the housing 42 and a stator coolant connector 132, only one of which is shown, to allow coolant to enter and exit the stator 128. Preferably, an insulator is disposed between the cooling jacket 130 and the housing 42. It should be appreciated that coolant flows through tubes 134 in windings 136 of the stator 128 and channels 138 in the cooling jacket 130.

The stator 128 has a plurality of laminations 140 through which the windings 136 axially extend. The windings 136 are made of copper wire and potted in epoxy as is known in the art. The stator 128 includes a three phase electrical power connector 142, only one phase of which is shown, connected to the windings 136. The passing of current through the windings 136 creates a magnetic field which extend radially past the inner diameter of the stator 78. The windings 136 have end turns which extend around the inner diameter on the end of the stator 128. It should be appreciated that the end turns are a convenient way to form a closed circuit.

The rotor 126 includes a plurality of nonlinear slots cut through the length adjacent the outer diameter of the rotor. Within each slot, a magnetically susceptible bar 137 is forced therein. The magnetically susceptible bars 137 extend axially adjacent the rotor outer diameter. The magnetically susceptible bars 137 receive the magnetic field created by the electrical currents passing through the windings 136 and create a current therein. Upon receiving the magnetic fields, the magnetically susceptible bars 137 are forced to move relative to their existing position, rendering the rotation of the rotor 126. The magnetically susceptible bars 137 are spaced equidistantly from each other about the rotor outer diameter.

The magnetically susceptible bars 137 are fabricated from a copper alloy. More specifically, these coppers bars are fabricated from copper with forty percent (40%) by weight of the bars coming from an aluminum oxide. The aluminum oxide enables the coppers bars to maintain a higher tensile strength, a lower weight, and a more effective surface area for better high frequency current capability. The tensile strength is approximately 50 ksi, as opposed to 15 ksi, at 600° F.

The alternator rotor 126 and shaft 51 are supported in a titanium bearing frame 144 of the housing 42 by hydrodynamic radial or rotary bearings 146. The alternator rotor 126 and shaft 51 are also supported by hydrodynamic thrust or axial bearings 148 disposed between the shaft 51 and the bearing frame 144. The bearings are used to support and align the alternator rotor. Suitable bearings can be commercially purchased from KMC, Inc. of W. Greenwich, R.I. The alternator rotor 126 is a solid rotor of AERMET 100 steel having a central bore. It should be appreciated that the alternator rotor 126 is cooled in a manner to be described.

The intake duct 54 receives compressed air from the compressor impeller 108 through a passageway 150. At the aft end, the turbine shroud 152 is disposed about the turbine. The turbine shroud 152 communicates with the turbine duct 58 and the outlet duct 56. The exhaust gases flow from the outlet duct 56 through a passageway 154 to the turbine shroud 152. Preferably, the turbine shroud 152 is made of an Inconel material as is known in the art.

The combustor 52 includes at least one nozzle (not shown) which sprays fuel and is mixed with the compressed air. The combustor 52 also include an ignitor (not shown) which is connected to the power controller 18 to ignite and combust the air/fuel mixture. The combustion of the air/fuel mixture generates hot exhaust gases at about 1900° F. (1038° C.) which flow through the outlet duct 54 to drive the turbine impeller 118.

In operation of the turboalternator 16, air enters the intake 32 and is compressed by the low speed compressor 36 and is cooled in the intercooler duct 44. The high speed compressor 46 further compresses the cooled air from the duct 44. The compressed air flows from the high speed compressor 46 through the intake duct 54 to the combustor 52. Fuel is sprayed in the combustor 52 and the ignitor powered to combust the fuel/air mixture. The hot combustion or exhaust gases flow through the outlet duct 56 to the high speed turbine 48 and rotate the high speed turbine 48. The exhaust gases flow through the high speed turbine 48 and turbine duct 58 to the low speed turbine 38. The exhaust gases rotate the low speed turbine 38 and exit through the exhaust 34. The high speed turbine 48 rotates the shaft 51 and, in turn, rotates the compressor impeller and alternator rotor. The low speed turbine 38 rotates the shaft 41 and, in turn, rotates the compressor impeller and alternator rotor.

Figure 6:
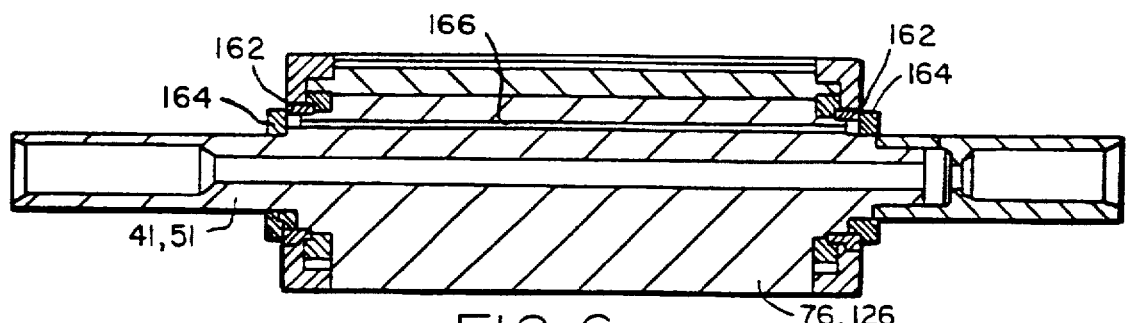
FIG. 6 is an enlarged fragmentary elevational view of a portion of FIG. 5.

Referring to FIGS. 4 through 6, the rotor 76, 126 and shaft 41, 51 have a unique combination of hydrodynamic lubrication and cooling. For example, bearing coolant connectors 155 are attached to the bearing frame 94. The bearing frame 94 has a passageway 156 which extends radially from the connectors 155 and axially to a hydrodynamic face seal 158 disposed between the frame 94 and rotor 76. A passageway 160 extends axially between the face seal 158 and rotor and communicates with a Barske pump 162 disposed about each end of the rotor 76, 126. The Barske pump 162 has a plurality of turbine blade-looking teeth (not shown). The Barske pump 162 is welded into a pocket using an Inconel ring as the weld material. A seal runner 164 is threaded onto the Barske pump 162. The Barske pump 162 communicates with at least one passageway 166 extending axially through the rotor. The Barske pump 162 assists in pumping water through the passageway 166 at high speeds of the rotor 76, 126 without changing the phase of the fluid while remaining neutral or transparent to a main cooling system pump (not shown). It should be appreciated that coolant such as water flows from one connector 155, passageway 156 and 160, pump 162, passageway 166, pump 162, passageway 160 and 156 to the other connector 155.

Figure 7:
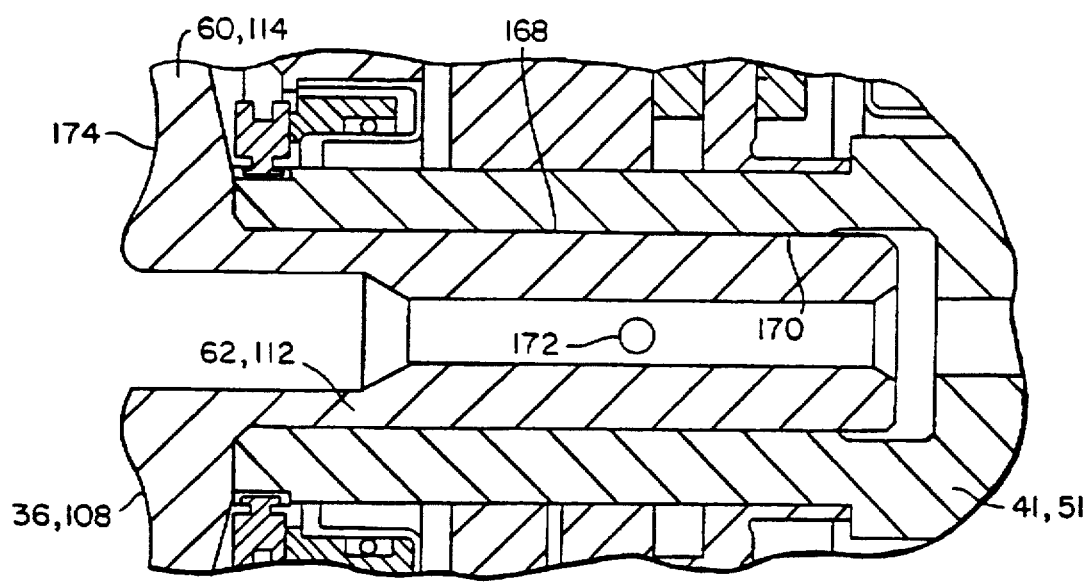
FIG. 7 is an enlarged fragmentary elevational view of a portion of FIG. 6.

Referring to FIG. 7, the compressor impellers and turbine impellers have a tapered hydraulic fit, according to the present invention, with the shaft 41, 51. For example, the first end of the impellers have an outer surface 168 which is tapered to an enlarged diameter from the first end to the second end. The shaft has a cavity 170 which extends axially and is tapered complementary to the outer surface 168 of the first end of the impeller. The taper on the outer surface 168 and cavity 170 is a predetermined amount such as three (3) degrees. The impeller is fastened to the end of the shaft with a combination of an axial load and hydraulic pressure. The pressure is applied through the center of the impeller and then radially out an aperture 172 to the taper and is on the order of twenty-five (25) ksi. The two components are mostly engaged prior to being pressed into final position which minimizes galling during both assembly and disassembly. The taper also provides an inherent separation force when pressurized. It should be appreciated that the tapered hydraulic fit allows for the ability to use dissimilar component materials and a consistent component to assembly dynamic balance.

Figure 8:
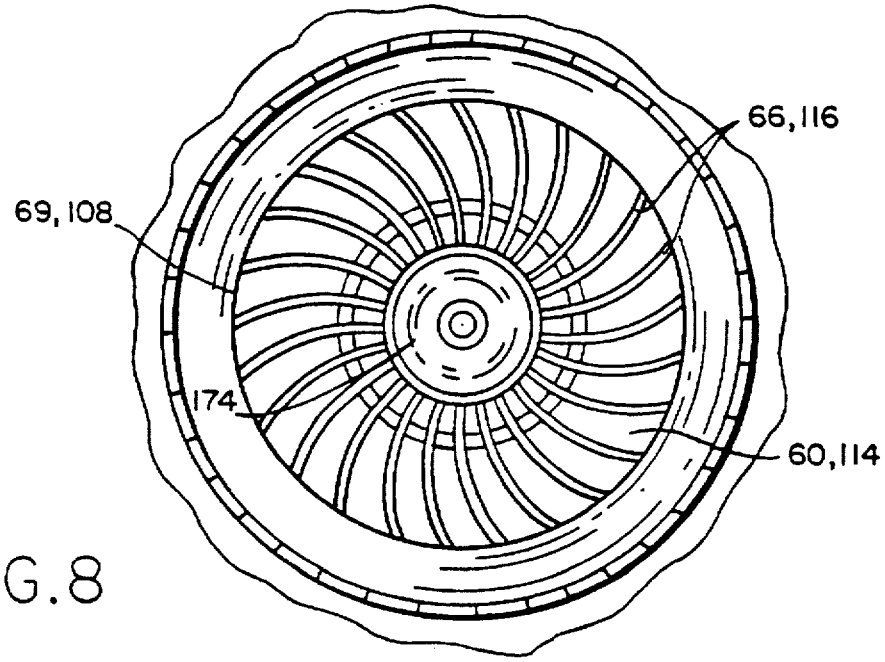
FIG. 8 is a side elevational view of a portion of the turboalternator of FIG. 5.

Referring to FIG. 8, the compressor impeller 64, 108 is preferably made of a titanium or titanium alloy material. The second end has a cavity 174 extending axially and radially to reduce mass of the impeller since the blades of the second end are axially outside or cantilevered over the bearings on the end of the shaft. The second end has sufficient material thickness where there is peak stress. The compressor impeller could be made of Aluminum or a steel material if designed out of the operating range for vibrational purposes. It should be appreciated that the turbine impeller is not hollowed out due to the high temperatures and stress. It should also be appreciated that the hollowed out compressor impeller is compact and less expensive versus machining operation.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A turboalternator for a hybrid motor vehicle comprising:

a compressor having a compressor impeller;

a turbine having a turbine rotor;

an alternator disposed between said compressor and said turbine; and a common shaft interconnecting said compressor, said alternator and said turbine;

wherein said shaft is supported by hydrodynamic bearings, and wherein said alternator comprises a solid alternator rotor extending radially from said shaft, said rotor having a plurality of slots adjacent to the outer diameter of the rotor, each slot containing an electrically conductive, magnetically susceptible bar.

2. A turboalternator as set forth in claim 1 wherein said compressor comprises an impeller connected to said common shaft.

3. A turboalternator as set forth in claim 1 wherein said turbine comprises an impeller connected to said common shaft.

4. A turboalternator as set forth in claim 1 wherein said compressor comprises a compressor impeller connected to said common shaft.

5. A turboalternator as set forth in claim 4 wherein said turbine comprises a turbine impeller connected to said common shaft.

6. A turboalternator as set forth in claim 1 wherein said alternator comprises an alternator rotor disposed between said compressor rotor and said turbine rotor and connected to said common shaft, said compressor rotor and alternator rotor and said turbine rotor being directly driven on said common shaft.

7. A turboalternator for a hybrid motor vehicle comprising:

a compressor having a compressor impeller;

a turbine having a turbine rotor;

an alternator disposed between said compressor and said turbine; and a common shaft interconnecting said compressor, said alternator and said turbine;

wherein said shaft is supported by hydrodynamic bearings, wherein said alternator comprises a solid alternator rotor extending radially from said shaft, said rotor having a plurality of slots adjacent to the outer diameter of the rotor, each slot containing an electrically conductive, magnetically susceptible bar, and wherein said alternator and said shaft are provided with lubrication and also have hydrodynamic cooling, both using the same fluid stream.

8. A turboalternator for a hybrid motor vehicle comprising:

a compressor;

a turbine;

an alternator disposed between said compressor and said turbine; and a common shaft interconnecting said compressor, said alternator and said turbine;

wherein said alternator comprises a solid alternator rotor extending radially from said shaft, said rotor having a plurality of slots adjacent to the outer diameter of the rotor, each slot containing an electrically conductive, magnetically susceptible bar.

9. The turboalternator as set forth in claim 8, wherein said shaft is supported by hydrodynamic bearings.

10. The turboalternator as set forth in claim 8, wherein said slots in said alternator rotor are spaced equidistantly from each other about an outer diameter of the rotor.

11. The turboalternator as set forth in claim 8, wherein each of said bars comprises copper.

12. A turboalternator for a hybrid motor vehicle comprising:

a compressor;

a turbine;

an alternator disposed between said compressor and said turbine; and a common shaft interconnecting said compressor, said alternator and said turbine;

wherein said alternator comprises a solid alternator rotor extending radially from said shaft, said rotor having a plurality of slots adjacent to the outer diameter of the rotor, each slot containing an electrically conductive, magnetically susceptible bar, wherein said rotor and said shaft are provided with lubrication and also have hydrodynamic cooling, both using the same fluid stream.

13. A hybrid motor vehicle comprising:

a chassis;

at least two wheels connected to said chassis; and a hybrid powertrain system operatively connected to at least one of said two wheels to create a force to move said chassis, said hybrid powertrain system comprising a turboalternator;

wherein said turboalternator comprises:

a compressor;

a turbine;

an alternator disposed between said compressor and said turbine; and a common shaft interconnecting said compressor, said alternator and said turbine;

wherein said alternator comprises a solid alternator rotor extending radially from said shaft, said rotor having a plurality of slots adjacent to the outer diameter of the rotor, each slot containing an electrically conductive, magnetically susceptible bar.

14. The hybrid motor vehicle as set forth in claim 13, wherein said shaft is supported by hydrodynamic bearings.

15. The hybrid motor vehicle as set forth in claim 13, wherein said slots in said alternator rotor are spaced equidistantly from each other about an outer diameter of the alternator rotor.

16. The hybrid motor vehicle as set forth in claim 13, wherein each of said bars comprises copper.

17. A hybrid motor vehicle comprising:

a chassis;

at least two wheels connected to said chassis; and a hybrid powertrain system operatively connected to at least one of said two wheels to create a force to move said chassis, said hybrid powertrain system comprising a turboalternator;

wherein said turboalternator comprises:

a compressor;

a turbine;

an alternator disposed between said compressor and said turbine; and a common shaft interconnecting said compressor, said alternator and said turbine;

wherein said alternator comprises a solid alternator rotor extending radially from said shaft, said rotor having a plurality of slots adjacent to the outer diameter of the rotor, each slot containing an electrically conductive, magnetically susceptible bar, wherein said rotor and said shaft are provided with lubrication and also have hydrodynamic cooling, both using the same fluid stream.

18. A turboalternator for a hybrid motor vehicle comprising:

a compressor having a compressor impeller;

a turbine having a turbine rotor;

an alternator disposed between said compressor and said turbine; and a common shaft interconnecting said compressor, said alternator and said turbine;

wherein said shaft is supported by hydrodynamic bearings, and wherein said alternator and said shaft are provided with lubrication and also have hydrodynamic cooling, both using the same fluid stream.

19. A turboalternator for a hybrid motor vehicle comprising:

a compressor;

a turbine;

an alternator disposed between said compressor and said turbine; and a common shaft interconnecting said compressor, said alternator and said turbine;

wherein said alternator and said shaft are provided with lubrication and also have hydrodynamic cooling, both using the same fluid stream.

20. A hybrid motor vehicle comprising:

a chassis;

at least two wheels connected to said chassis; and a hybrid powertrain system operatively connected to at least one of said two wheels to create a force to move said chassis, said hybrid powertrain system comprising a turboalternator;

wherein said turboalternator comprises:

a compressor;

a turbine;

an alternator disposed between said compressor and said turbine; and a common shaft interconnecting said compressor, said alternator and said turbine;

wherein said alternator and said shaft are provided with lubrication and also have hydrodynamic cooling, both using the same fluid stream.

* * * * *